(12) United States Patent
Yen et al.

(10) Patent No.: US 11,545,897 B2
(45) Date of Patent: Jan. 3, 2023

(54) GATE DRIVER POWER-SAVING METHOD FOR SWITCHED-MODE POWER SUPPLIES IN PULSE-SKIPPING MODE

(71) Applicant: QUALCOMM Incorporated, San Diego, CA (US)

(72) Inventors: Ta-Tung Yen, San Jose, CA (US); Guoyong Guo, San Jose, CA (US); Chunping Song, Palo Alto, CA (US); Hector Ivan Oporta, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 17/021,591

(22) Filed: Sep. 15, 2020

(65) Prior Publication Data

US 2021/0083572 A1 Mar. 18, 2021

Related U.S. Application Data

(60) Provisional application No. 62/901,600, filed on Sep. 17, 2019.

(51) Int. Cl.
*H02M 3/07* (2006.01)
*H02J 7/00* (2006.01)
*H02M 1/08* (2006.01)

(52) U.S. Cl.
CPC .............. *H02M 3/073* (2013.01); *H02J 7/007* (2013.01); *H02M 1/08* (2013.01); *H02J 2207/20* (2020.01)

(58) Field of Classification Search
CPC .......... H02M 1/08; H02M 3/07; H02M 3/073; H02J 7/007; H02J 2207/20
USPC .......... 323/282, 283; 327/108, 109, 110, 111
See application file for complete search history.

(56) References Cited

U.S. PATENT DOCUMENTS

| | | | |
|---|---|---|---|
| 6,201,717 B1* | 3/2001 | Grant ................. | H02M 3/1588 363/16 |
| 6,242,970 B1* | 6/2001 | Grant ..................... | H02M 3/07 327/390 |
| 2007/0177412 A1* | 8/2007 | Sharp ..................... | H02M 3/07 363/59 |
| 2021/0083573 A1* | 3/2021 | Yen ........................ | H02M 3/073 |
| 2022/0181968 A1* | 6/2022 | Mao ........................ | H02M 3/07 |

* cited by examiner

*Primary Examiner* — William Hernandez
(74) *Attorney, Agent, or Firm* — Patterson+ Sheridan, L.L.P.

(57) ABSTRACT

Techniques and apparatus for controlling gate drivers of a switched-mode power supply (SMPS) circuit—such as a three-level buck converter, a divide-by-two charge pump, or an adaptive combination power supply circuit capable of switching therebetween—in a power-saving mode (e.g., a pulse-skipping mode). During such a power-saving mode in which a capacitor of a charge pump is disconnected from at least one power supply rail (e.g., first and second input nodes of the charge pump) and is coupled to power terminals of one or more drivers of the SMPS circuit, the capacitor is temporarily disconnected from the power terminals and temporarily coupled to the at least one power supply rail (e.g., for a few microseconds).

30 Claims, 5 Drawing Sheets

GATE DRIVER POWER-SAVING METHOD FOR SWITCHED-MODE POWER SUPPLIES IN PULSE-SKIPPING MODE

CROSS-REFERENCE TO RELATED APPLICATION(S)

This application claims the benefit of priority to U.S. Provisional application Ser. No. 62/901,600, entitled "Gate Driver Power-Saving Method for Switched-Mode Power Supplies in Pulse-Skipping Mode" and filed Sep. 17, 2019, which is expressly incorporated by reference herein in its entirety as if fully set forth below and for all applicable purposes.

TECHNICAL FIELD

Certain aspects of the present disclosure generally relate to electronic circuits and, more particularly, to a driver architecture for switched-mode power supplies.

BACKGROUND

A voltage regulator provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler, for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power requirement of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide a power supply circuit. The power supply circuit generally includes a switched-mode power supply (SMPS) circuit and a charge pump. The SMPS circuit has a first input voltage node and a second input voltage node. The charge pump includes a first capacitive element having a first terminal and a second terminal, a first switch coupled between a first input node of the charge pump and the first terminal of the first capacitive element, a second switch coupled between the second terminal of the first capacitive element and a second input node of the charge pump, a third switch coupled between the first terminal of the first capacitive element and the first input voltage node of the SMPS circuit, and a fourth switch coupled between the second terminal of the first capacitive element and the second input voltage node of the SMPS circuit. In a first phase, the first and second switches are configured to be closed, and the third and fourth switches are configured to be open. In a second phase, the third and fourth switches are configured to be closed, and the first and second switches are configured to be open. The power supply circuit is configured to operate the charge pump in the second phase in a power-saving mode and is configured to temporarily operate the charge pump in the first phase in the power-saving mode to recharge the first capacitive element.

Certain aspects of the present disclosure provide a method of supplying power. The method generally includes operating a power supply circuit comprising an SMPS circuit and a charge pump. The SMPS circuit has a first input voltage node and a second input voltage node. The charge pump generally includes a capacitive element having a first terminal and a second terminal, a first switch coupled between a first input node of the charge pump and the first terminal of the capacitive element, a second switch coupled between the second terminal of the capacitive element and a second input node of the charge pump, a third switch coupled between the first terminal of the capacitive element and the first input voltage node of the SMPS circuit, and a fourth switch coupled between the second terminal of the capacitive element and the second input voltage node of the SMPS circuit. In a first phase, the operating comprises closing the first and second switches and opening the third and fourth switches. In a second phase, the operating comprises closing the third and fourth switches closed and opening the first and second switches. The method further includes entering a power-saving mode for the power supply circuit by operating the charge pump in the second phase and temporarily operating the charge pump in the first phase during the power-saving mode to recharge the capacitive element.

Certain aspects of the present disclosure provide a power supply circuit. The power supply circuit generally includes an SMPS circuit having a first input voltage node, a second input voltage node, a third input voltage node, an output voltage node, and a reference potential node; a charge pump comprising: a first capacitive element having a first terminal and a second terminal; a first switch coupled between an input node of the charge pump and the first terminal of the first capacitive element; a second switch coupled between the second terminal of the first capacitive element and the reference potential node; a third switch coupled between the first terminal of the first capacitive element and the second input voltage node of the SMPS circuit; and a fourth switch coupled between the second terminal of the first capacitive element and the third input voltage node of the SMPS circuit; and a comparator having a first input coupled to the first terminal of the first capacitive element and a second input coupled to the second terminal of the first capacitive element.

Certain aspects of the present disclosure provide a power management integrated circuit (PMIC) comprising at least a portion of the power supply circuit described herein.

Certain aspects of the present disclosure provide a battery charging circuit comprising the power supply circuit described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure provide techniques and apparatus for controlling gate drivers of a switched-mode power supply (SMPS) in a power-saving mode (e.g., a pulse-skipping mode).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCSs), personal digital assistants (PDAs), and the like.

Figure 1:
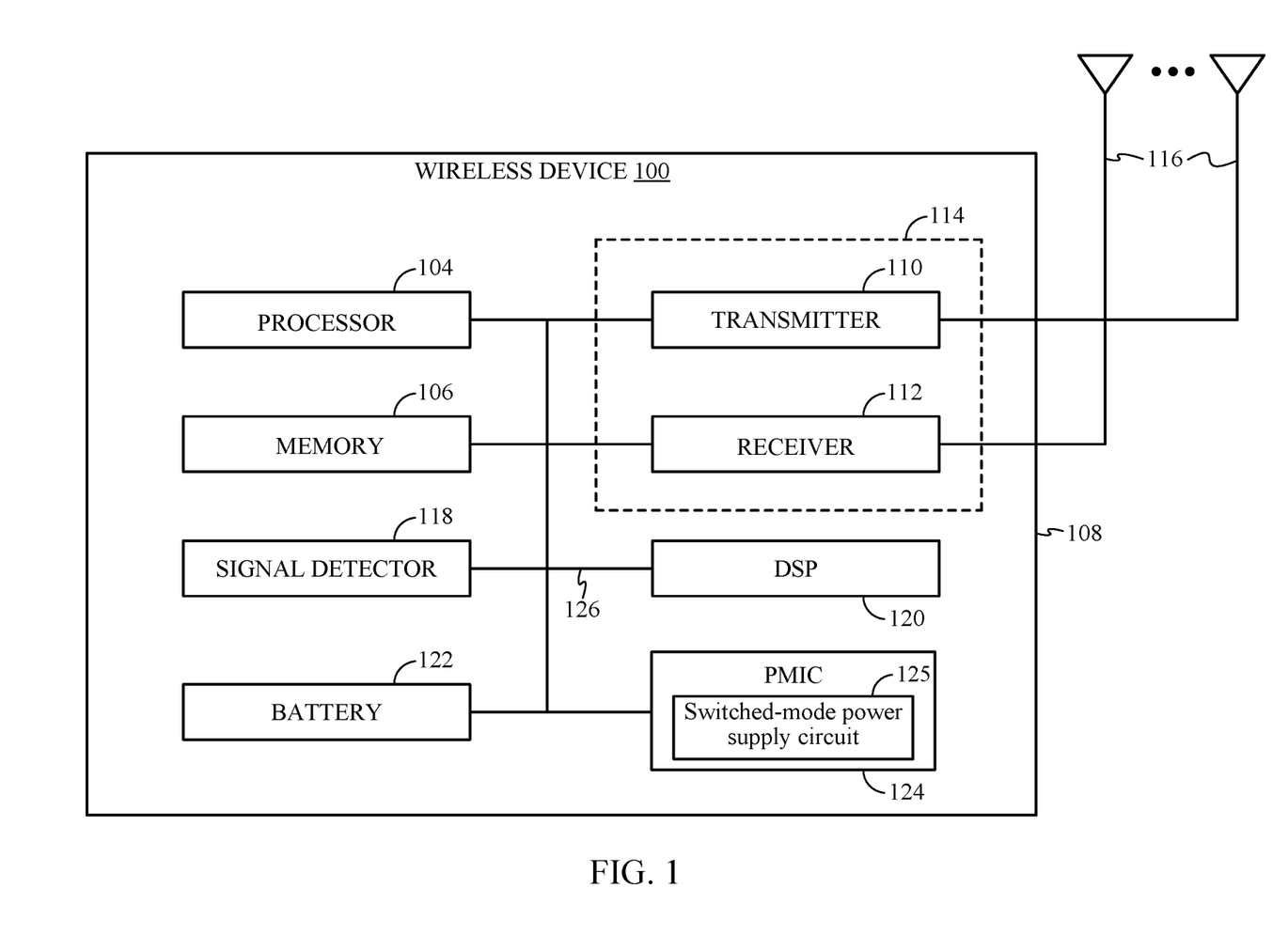
FIG. 1 illustrates a block diagram of an example device that includes a switched-mode power supply (SMPS) circuit, in accordance with certain aspects of the present disclosure.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include at least a portion of a power supply circuit, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit (e.g., the power supply circuit 200 of FIG. 2A), which can switch between operating as a three-level buck converter and a Div2 charge pump. For certain aspects, the PMIC 124 may include a battery charging circuit (e.g., a master-slave battery charging circuit). For certain aspects, the power supply circuit may include a driver architecture with a charge pump, as described below.

The various components of the device 100 may be coupled together by a bus system 126, which may include a power bus, a control signal bus, and/or a status signal bus in addition to a data bus.

Example Power Supply Circuit and Operation

In order to charge the battery (e.g., battery 122) in a portable device (e.g., a smartphone, tablet, and the like), a battery charging circuit may be utilized. For certain aspects, the battery charging circuit, or at least a portion thereof, may reside in a PMIC (e.g., PMIC 124) in the device. The battery charging circuit may comprise, for example, one or more switched-mode power supplies (e.g., circuit 125, such as a buck converter and/or a charge pump converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies, such as a three-level buck converter topology. However, one or more of the buck converters may be replaced with a charge pump converter in some parallel charging circuits.

Figure 2A:
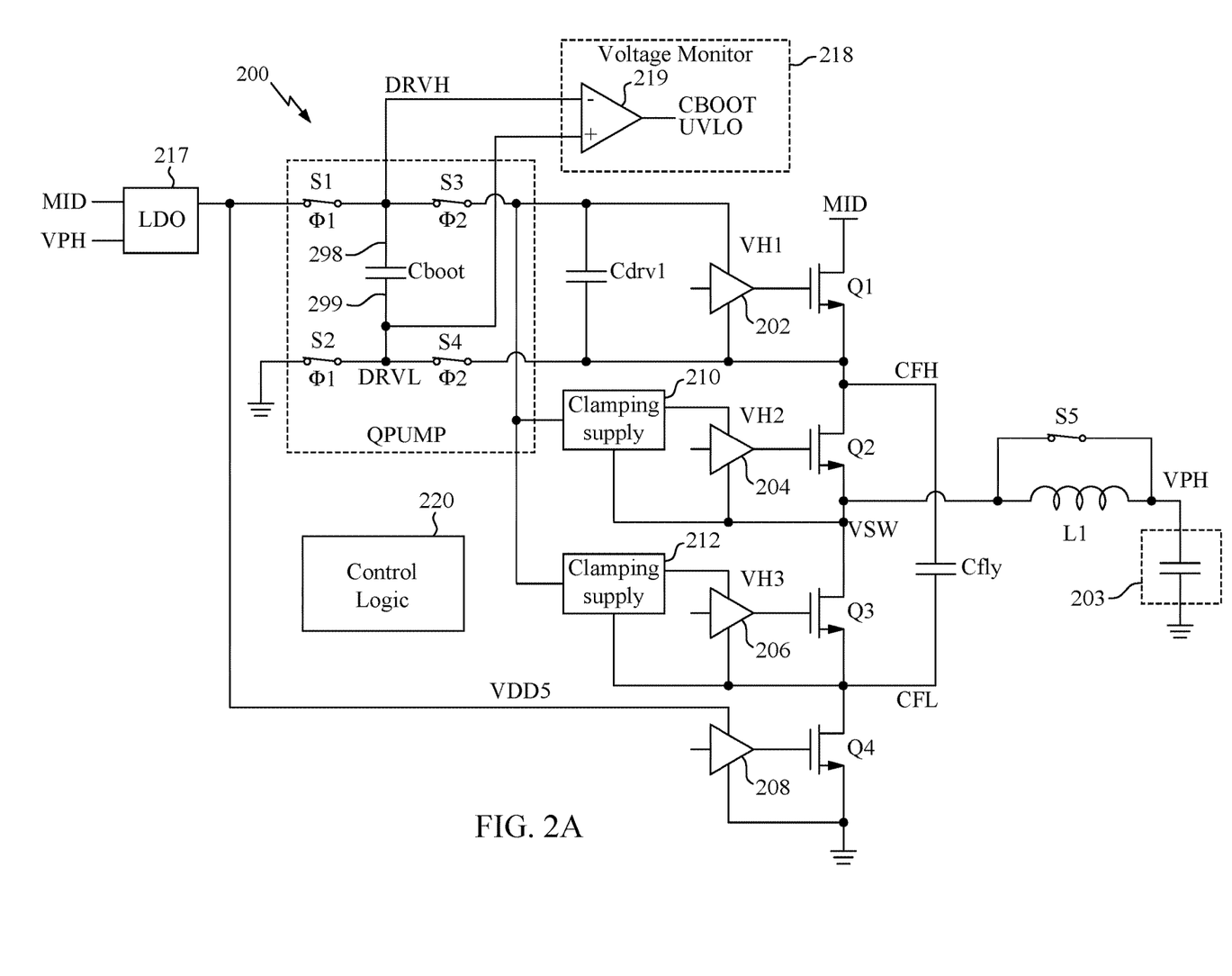
FIG. 2A is a circuit diagram of an example power supply circuit comprising a SMPS circuit and a charge pump for providing power to at least some of the drivers in the SMPS circuit, in accordance with certain aspects of the present disclosure.

A three-level buck converter topology (as illustrated in FIG. 2A) may include a first transistor Q1, a second transistor Q2, a third transistor Q3, a fourth transistor Q4, a flying capacitive element Cfly, an inductive element L1, and a load 203, which is represented here by a capacitor. An adaptive combination power supply circuit may be realized by adding a switch S5 across the inductive element L1 of the three-level buck converter topology.

Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 2A. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electric ground) for the power supply circuit 200. The flying capacitive element Cfly may have a first terminal coupled to the first node and a second terminal coupled to the third node. The inductive element L1 may have a first terminal coupled to the second node and a second terminal coupled to an output voltage node (labeled "VPH") and the load 203.

Control logic 220 may control operation of the power supply circuit 200. For example, control logic 220 may control operation of the transistors Q1-Q4 via output signals to the inputs of respective gate drivers 202, 204, 206, and 208. The outputs of the gate drivers 202, 204, 206, and 208 are coupled to respective gates of transistors Q1-Q4. During operation of the power supply circuit 200, the control logic 220 may cycle through four different phases, which may differ depending on whether the duty cycle is less than 50% or greater than 50%.

Operation of the power supply circuit 200 with a duty cycle of less than 50% is described first. In a first phase (referred to as a "charging phase"), transistors Q1 and Q3 are activated, and transistors Q2 and Q4 are deactivated, to charge the flying capacitive element Cfly and to energize the inductive element L1. In a second phase (called a "holding phase"), transistor Q1 is deactivated, and transistor Q4 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q2 and Q4 are activated, and transistor Q3 is deactivated, to discharge the flying capacitive element Cfly and to energize the inductive element L1. In a fourth phase (also referred to as a "holding phase"), transistor Q3 is activated, and transistor Q2 is deactivated, such that the flying capacitive element Cfly is disconnected and the inductive element L1 is deenergized.

Operation of the power supply circuit 200 with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "MID"), the flying capacitive element Cfly is disconnected, and the inductive element L1 is energized. Similarly in the fourth phase (also referred to as a "holding phase"), transistor Q1 is activated, and transistor Q4 is deactivated, such that the flying capacitive element Cfly is disconnected and the inductive element L1 is energized.

Furthermore, the control logic 220 has a control signal (not shown) configured to control operation of switch S5 and selectively enable divide-by-two (Div2) charge pump operation. For certain aspects, when this control signal is logic low, switch S5 is open, and the power supply circuit 200 operates as a three-level buck converter using the inductive element L1. When this control signal is logic high, switch S5 is closed, thereby shorting across the inductive element L1 and effectively removing the inductive element L1 from the circuit, such that the power supply circuit 200 operates as a Div2 charge pump. The control logic 220 may be configured to automatically control operation of switch S5 (e.g., through the logic level of the control signal) based on at least one of an input voltage (e.g., the voltage at the MID node) or an operation mode, for the power supply circuit 200.

In certain charger systems, the pre-regulator current consumption may be designed to be extremely low (e.g., <100 μA), which is a challenge for some gate driver architectures. Pulse skipping is a control scheme utilized to reduce the current consumption by reducing the switching frequency. During the pulse-skipping mode, the transistors Q1-Q4 are deactivated. In order to support the pulse-skipping scheme in a three-level buck converter, there are at least two problems for the driver architecture: (1) how to sustain the driver's floating supply voltage and bias current in the pulse-skipping mode; and (2) how to minimize (or at least lower) the driver quiescent current in the pulse-skipping mode.

Certain aspects of the present disclosure provide a power-saving method for use during the pulse-skipping mode. FIG. 2A is a circuit diagram of an example power supply circuit 200, in accordance with certain aspects of the present disclosure. The power supply circuit 200 includes an SMPS circuit (as described above) and a driver architecture for providing power to at least some of the drivers in the SMPS circuit. For example, the SMPS circuit may be a three-level buck converter, a Div2 charge pump, or an adaptive combination power supply circuit capable of switching between operation as a three-level buck converter and a Div2 charge pump. The SMPS circuit may be configurable between a three-level buck converter and a Div2 charge pump by opening or closing, respectively, switch S5 across inductive element L1.

As illustrated in FIG. 2A, the driver architecture for providing power to the four different drivers 202, 204, 206, 208 in the SMPS circuit may include a charge pump (labeled "QPUMP" with at least one capacitive element (e.g., represented by a single capacitor (referred to as "Cboot") as shown) and two sets of switches (e.g., a first set with switches S1 and S2 and a second set with switches S3 and S4). Switch S1 is coupled between a first input node (labeled "VDD5") of the charge pump and a first terminal of capacitor Cboot, and switch S2 is coupled between a second terminal of capacitor Cboot and a second input node (e.g., a reference potential node for the power supply circuit 200, such as electrical ground). Switch S3 is coupled between the first terminal of capacitor Cboot and a first input voltage node (labeled "VH1") of the SMPS circuit, and switch S4 is coupled between the second terminal of capacitor Cboot and second input voltage node (labeled "CFH") of the SMPS circuit. The first and second input voltage nodes of the SMPS circuit may be coupled to first and second power terminals, respectively, of the driver 202, across which may be coupled a capacitor Cdrv1, as illustrated.

The driver architecture may also include a voltage regulator 217 for providing a regulated voltage to the charge pump and/or to one or more of the drivers from one or more input voltages. The voltage regulator 217 may be implemented by any of various suitable voltage regulators, such as a low-dropout (LDO) regulator, as illustrated in FIG. 2A.

For certain aspects, the driver architecture may also include one or more clamping supplies 210 and 212 (e.g., floating supplies with a voltage clamping function), as depicted. The clamping supplies 210 and 212 provide voltages VH2 and VH3 from voltage VH1 with clamping at a particular voltage level (e.g., 5 V clamping).

With this driver architecture, the QPUMP provides the power supply voltages for the Q1, Q2, and Q3 drivers (e.g., drivers 202, 204, and 206, respectively). For example, the QPUMP generates the VH1 voltage, which is the Q1 driver supply (i.e., the driver power supply for driver 202, configured to drive transistor Q1). The Q2 and Q3 driver supplies VH2 and VH3 are generated by the clamping supplies 210 and 212, respectively, from the VH1 voltage. The Q4 driver (e.g., driver 208) may receive power from the output of the voltage regulator 217 (or the input voltage for the QPUMP), as illustrated in FIG. 2A. For certain aspects, the voltage regulator 217 (and the QPUMP power source) may be implemented by a linear voltage regulator (e.g., an LDO), which may be designed to select between multiple input power sources (e.g., between input voltage MID and output voltage VPH).

When the power supply circuit 200 enters the pulse-skipping mode, the QPUMP switches from phase 1 (Φ1) to phase 2 (Φ2) or remains in Φ2 if already in Φ2. This is done to leverage the charge pump's capacitor (Cboot) to sustain the internal driver's supply voltage and the bias current during the pulse-skipping mode. The Cboot voltage is monitored by a voltage monitor 218, which may be implemented by a comparator 219 as shown. The Cboot voltage is the voltage across the capacitor Cboot from a first terminal 298 of capacitor Cboot (coupled to the node labeled "DRVH") to a second terminal 299 of capacitor Cboot (coupled to the node labeled "DRVL"). Once the Cboot voltage is less than a threshold voltage (e.g., an under-voltage lockout (UVLO) threshold), the voltage monitor 218 switches logic states on an output signal (labeled "CBOOT_UVLO") sent to the control logic 220, which in turn outputs control signals to control the QPUMP switches S1-S4. Thus, the QPUMP temporarily switches to Φ1 to replenish the Cboot voltage (e.g., in a few microseconds), and then switches back to Φ2. The QPUMP switches from Φ2 to Φ1 by opening switches S3 and S4 and closing switches S1 and S2. The QPUMP switches from Φ1 back to Φ2 by opening switches S1 and S2 and closing switches S3 and S4. In this manner, the QPUMP switching frequency may be reduced by 1000× during pulse-skipping mode, compared to the normal non-pulse-skipping operation mode, so the switching losses can be minimized (or at least reduced).

Figure 2B:
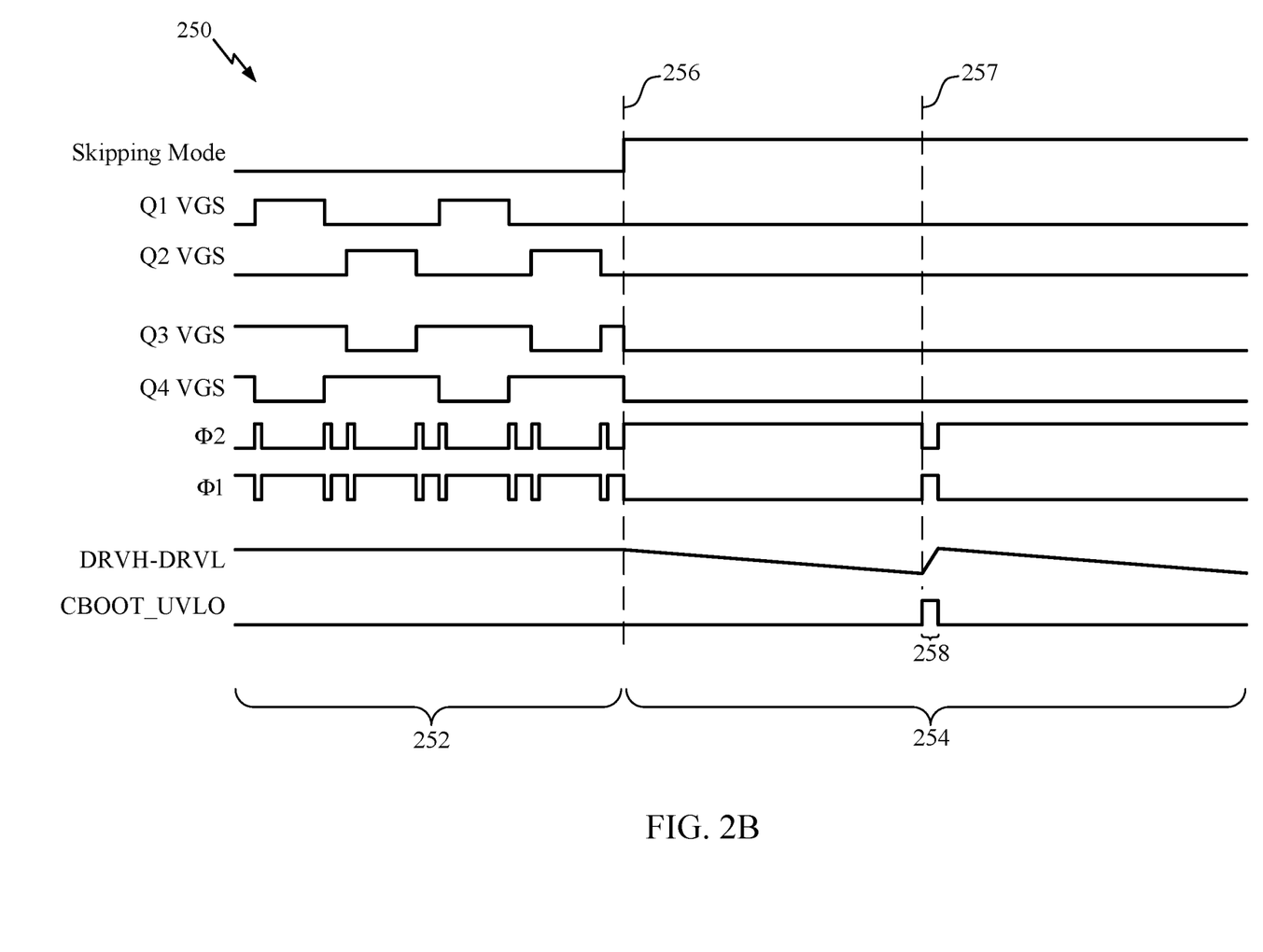
FIG. 2B is an example timing diagram for the power supply circuit of FIG. 2A, based on a comparator output during a pulse-skipping mode, in accordance with certain aspects of the present disclosure.

FIG. 2B is an example timing diagram 250 for the power supply circuit 200 of FIG. 2A, based on the output of the voltage monitor 218 during the pulse-skipping mode, in accordance with certain aspects of the present disclosure. As illustrated in FIG. 2B, the power supply circuit 200 may operate in a non-pulse-skipping mode (e.g., a switching mode) during time period 252. While operating in the non-pulse-skipping mode, if any one of the transistors Q1-Q4 transitions to being turned ON or OFF, the power supply circuit 200 switches to Φ2 to draw power from the Cboot, and then switches back to Φ1 to recharge the capacitor Cboot. During this period 252, the voltage difference across the capacitor Cboot (i.e., the Cboot voltage, labeled as "DRVH-DRVL") remains at a relatively high voltage, indicating that the capacitor Cboot remains charged. Due to this, the CBOOT_UVLO signal remains deasserted (e.g., in a logic low state as shown).

At a time 256, the power supply circuit 200 may switch to the pulse-skipping mode (e.g., the Skipping Mode signal may be asserted by switching from logic low to logic high). The power supply circuit 200 may then switch to Φ2 and operate in the pulse-skipping mode during a time period 254 (e.g., until the Skipping Mode signal is deasserted).

At a time 257 during the time period 254, the voltage monitor 218 may detect that the Cboot voltage does not meet some defined condition (e.g., the Cboot voltage is less than the UVLO threshold). The power supply circuit 200 may then switch to Φ1 for a time period 258, which is relatively short (e.g., a few μs), to replenish the Cboot voltage. At the end of time period 258, after the capacitor Cboot is recharged, the power supply circuit 200 may switch back to Φ2, at least until the Cboot voltage again fails to meet the defined condition during the time period 254.

As an alternative to using the voltage monitor 218 as shown in FIG. 2A, the QPUMP switching frequency may be set to a fixed value during the pulse-skipping mode. When using a fixed switching frequency, the power supply circuit may not include a comparator for monitoring the Cboot voltage.

Figure 3:
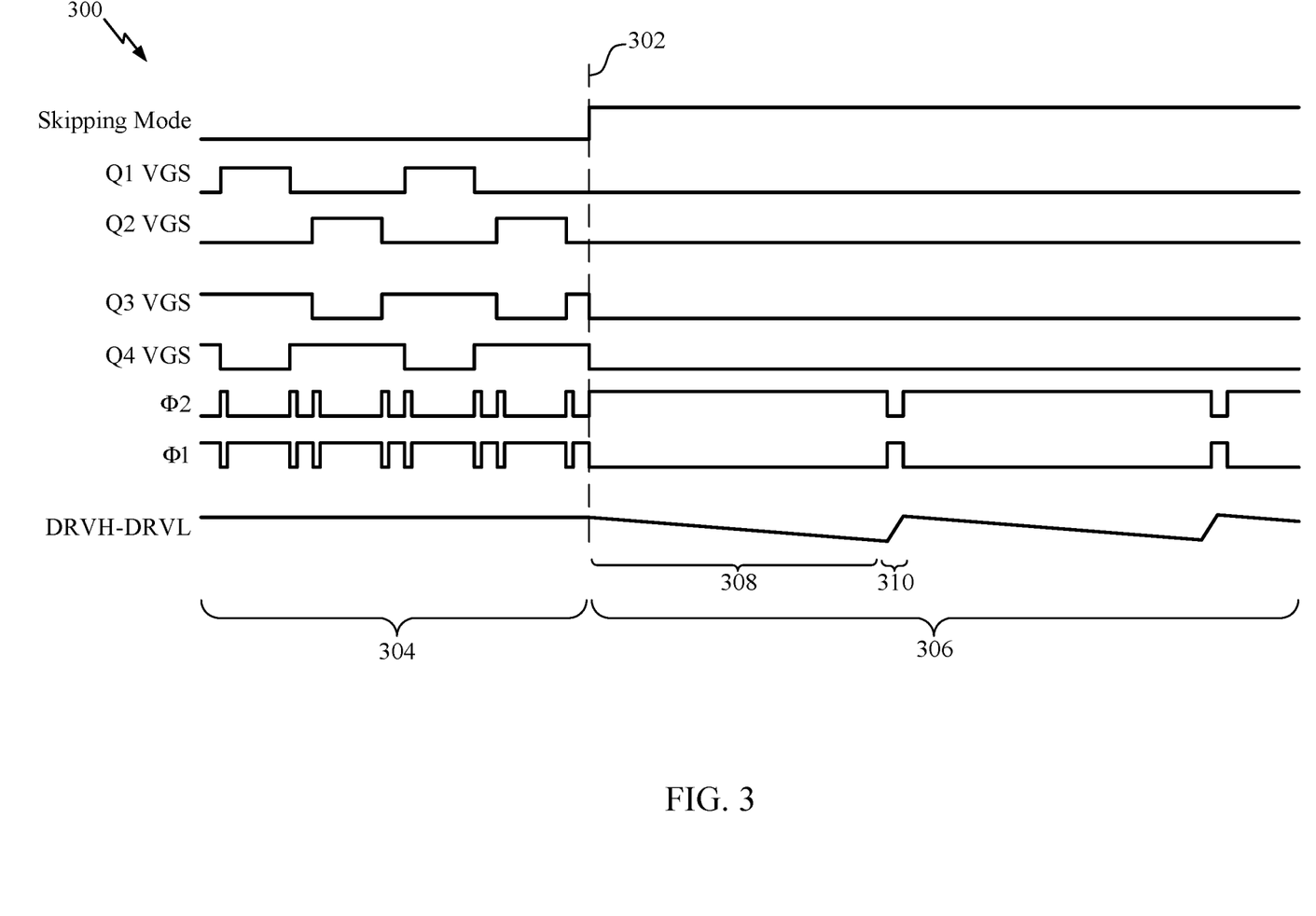
FIG. 3 is an example timing diagram for a power supply circuit, based on a fixed interval during a pulse-skipping mode, in accordance with certain aspects of the present disclosure.

FIG. 3 is an example timing diagram 300 for a power supply circuit similar to power supply circuit 200, based on a fixed interval during the pulse-skipping mode, in accordance with certain aspects of the present disclosure. As illustrated in FIG. 3, the power supply circuit may operate in a non-pulse-skipping mode during time period 304, similar to the period 252 described above. At a time 302, the power supply circuit may switch to the pulse-skipping mode. The power supply circuit may then switch to Φ2 and operate in the pulse-skipping mode during a time period 306.

After a fixed time interval 308, the power supply circuit may switch to Φ1 for a time interval 310, which is relatively short (e.g., a few μs), to replenish the Cboot voltage. At the end of time interval 310, after the capacitor Cboot is recharged, the power supply circuit may switch back to Φ2 for another time interval having a duration equal to that of fixed time interval 308, before switching to Φ1 for another relatively short period. This cycle may repeat until the power supply circuit exits the pulse-skipping mode.

The driver architecture described herein offers several advantages. First, the driver architecture described herein supports pulse-skipping operation. This scheme uses a capacitor (e.g., the Cboot capacitor, which may be an external capacitor) having a relatively large capacitance value to sustain the internal driver supplies for a long time and replenish the capacitor through a short pulse (e.g., a few μs). Second, the driver architecture described herein may optimize (or at least reduce) the gate-driver current consumption compared to conventional designs. Because the driver charge-pump frequency can be slowed down through detecting the Cboot UVLO signal, the current consumption may be optimized to the minimum value, or at least reduced. Third, the driver architecture described herein allows for replenishing the capacitor (e.g., Cboot) without causing a boost-back issue. Fourth, the driver architecture described herein may simplify the input removal detection method. Since there is no boost-back issue in the method described herein, the input voltage ramps down to the output voltage when the input is removed. Thus, the input removal detection can be simplified, and the many situations due to the boost-back issue need not be considered.

Example Operations for Supplying Power

Figure 4:
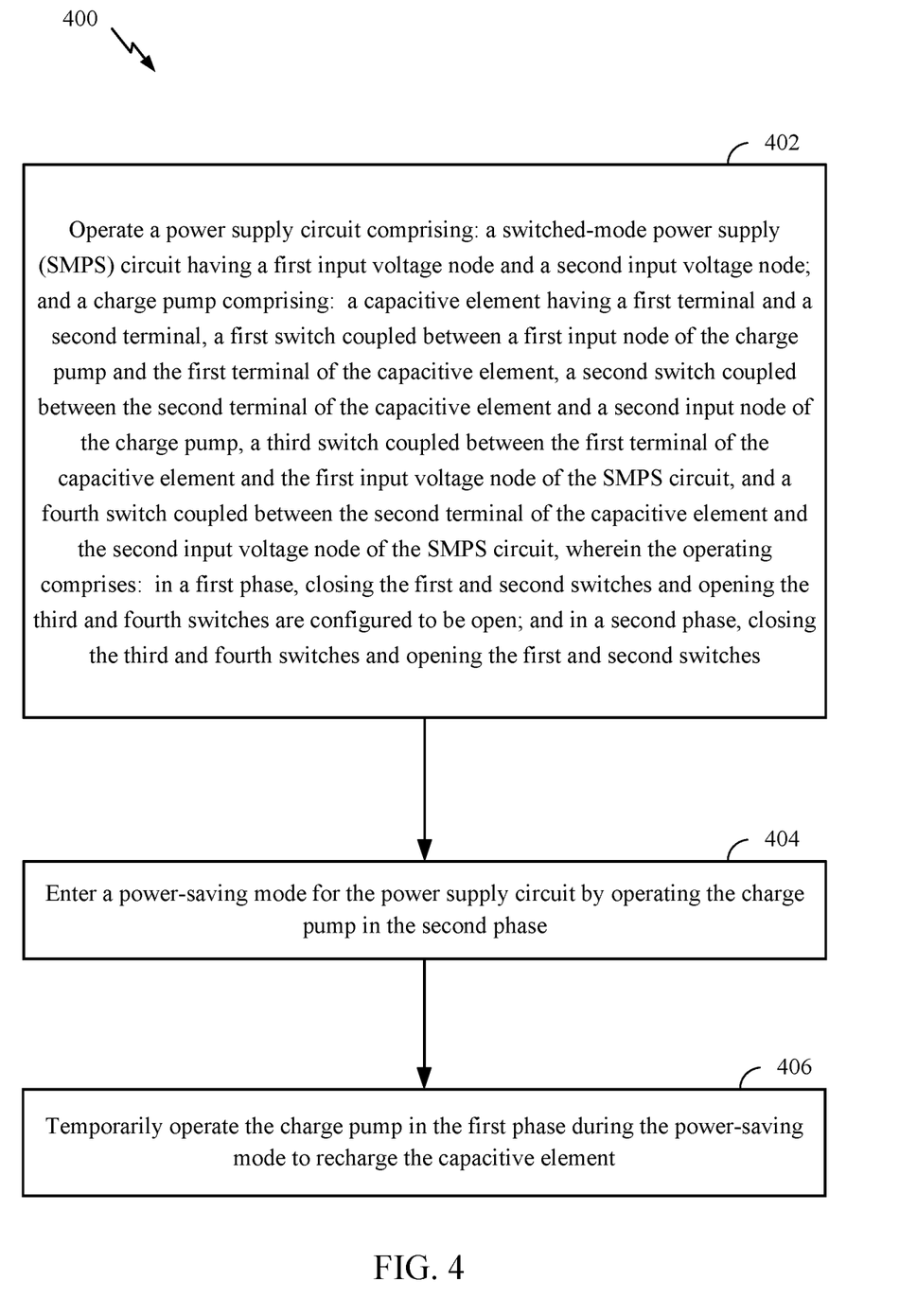
FIG. 4 is a flow diagram of example operations for supplying power, in accordance with certain aspects of the present disclosure.

FIG. 4 is a flow diagram of example operations 400 for supplying power, in accordance with certain aspects of the present disclosure. The operations 400 may be performed by a power supply circuit (e.g., the power supply circuit 200 of FIG. 2A).

The operations 400 may begin, at block 402, with the power supply circuit operating (e.g., in a switching mode). The power supply circuit includes an SMPS circuit and a charge pump (e.g., QPUMP). The SMPS circuit has a first input voltage node (e.g., the VH1 node) and a second input voltage node (e.g., the CFH node). The charge pump comprises a capacitive element (e.g., Cboot) having a first terminal (e.g., first terminal 298) and a second terminal (e.g., second terminal 299), a first switch (e.g., switch S1) coupled between a first input node (e.g., the VDD5 node) of the charge pump and the first terminal of the capacitive element, a second switch (e.g., switch S2) coupled between the second terminal of the capacitive element and a second input node (e.g., the reference potential node) of the charge pump, a third switch (e.g., switch S3) coupled between the first terminal of the capacitive element and the first input voltage node of the SMPS circuit, and a fourth switch (e.g., switch S4) coupled between the second terminal of the capacitive element and the second input voltage node of the SMPS circuit. In a first phase (e.g., Φ1), the operating at block 402 includes closing the first and second switches and opening the third and fourth switches. In a second phase (e.g., Φ2), the operating at block 402 entails closing the third and fourth switches and opening the first and second switches.

At block 404, the power supply circuit enters a power-saving mode therefor by operating the charge pump in the second phase. In some cases, the power-saving mode is a pulse-skipping mode. For certain aspects, the SMPS circuit further includes a plurality of transistors. In this case, the operations 400 may involve deactivating the plurality of transistors during the power-saving mode.

At block 406, the power supply circuit temporarily operates the charge pump in the first phase during the power-saving mode to recharge the capacitive element. In some cases, temporarily operating the charge pump at block 406 may include periodically temporarily operating the charge pump in the first phase according to a constant interval during the power-saving mode.

In certain aspects, the operations 400 further entail the power supply circuit determining a difference between voltages at the first and second terminals of the capacitive element. During the power-saving mode in this case, the charge pump may be operated in the second phase until the difference between the voltages falls below a threshold voltage (e.g., Cboot UVLO), and then, the charge pump may be temporarily operated in the first phase.

According to certain aspects, the power supply circuit may further include a voltage regulator (e.g., voltage regulator 217) having a first input coupled to a third input voltage node (e.g., the MID node) of the SMPS circuit, having a second input coupled to an output voltage node (e.g., the VPH node) of the SMPS circuit, and having an output coupled to the first input node of the charge pump. In this case, the operations 400 may further involve the power supply circuit selecting between the first input and the second input for supplying current to drive the SMPS circuit.

Certain aspects of the present disclosure provide a power supply circuit (e.g., power supply circuit 200). The power supply circuit generally includes a switched-mode power supply (SMPS) circuit having a first input voltage node (e.g., the MID node), a second input voltage node (e.g., the VH1 node), a third input voltage node (e.g., the CFH node), an output voltage node (e.g., the VPH node), and a reference potential node (e.g., electrical ground); a charge pump (e.g., QPUMP) comprising: a first capacitive element (e.g., Cboot) having a first terminal (e.g., first terminal 298) and a second terminal (e.g., second terminal 299); a first switch (e.g., switch S1) coupled between an input node (e.g., the VDD5 node) of the charge pump and the first terminal of the first capacitive element; a second switch (e.g., switch S2) coupled between the second terminal of the first capacitive element and the reference potential node; a third switch (e.g., switch S3) coupled between the first terminal of the first capacitive element and the second input voltage node of the SMPS circuit; and a fourth switch (e.g., switch S4) coupled between the second terminal of the first capacitive element and the third input voltage node of the SMPS circuit; and a comparator (e.g., comparator 219) having a first input (e.g., the negative terminal) coupled to the first terminal of the first capacitive element and a second input (e.g., the positive terminal) coupled to the second terminal of the first capacitive element.

In a first phase according to certain aspects, the first and second switches are configured to be closed, and the third and fourth switches are configured to be open. In a second phase for certain aspects, the third and fourth switches are configured to be closed, and the first and second switches are configured to be open. In this instance, the charge pump may be configured, during a pulse-skipping mode, to operate in the second phase until a difference between voltages at the first and second inputs of the comparator falls below a threshold voltage and to temporarily enter the first phase in response to the voltages at the first and second inputs of the comparator falling below the threshold voltage.

According to certain aspects, the power supply circuit further includes a voltage regulator (e.g., voltage regulator 217) having a first input coupled to the first input voltage node of the SMPS circuit and having an output coupled to the input node of the charge pump. The voltage regulator may also have a second input coupled to the output voltage node of the SMPS circuit, and in this case, the voltage regulator may be configured to select between the first input and the second input for supplying current to drive the SMPS circuit.

Certain aspects of the present disclosure provide a power supply circuit (e.g., power supply circuit 200). The power supply circuit includes a switched-mode power supply (SMPS) circuit having a first input voltage node (e.g., the VH1 node), a second input voltage node (e.g., the CFH node), and a charge pump (e.g., QPUMP). The charge pump generally includes a first capacitive element (e.g., Cboot) having a first terminal (e.g., the first terminal 298) and a second terminal (e.g., the second terminal 299), a first switch (e.g., switch S1) coupled between a first input node (e.g., the VDD5 node) of the charge pump and the first terminal of the first capacitive element, a second switch (e.g., switch S2) coupled between the second terminal of the first capacitive element and a second input node (e.g., the reference potential node) of the charge pump, a third switch (e.g., switch S3) coupled between the first terminal of the first capacitive element and the first input voltage node of the SMPS circuit, and a fourth switch (e.g., switch S4) coupled between the second terminal of the first capacitive element and the second input voltage node of the SMPS circuit. In a first phase (e.g., $\Phi 1$), the first and second switches are configured to be closed, and the third and fourth switches are configured to be open. In a second phase (e.g., $\Phi 2$), the third and fourth switches are configured to be closed, and the first and second switches are configured to be open. The power supply circuit is configured to operate the charge pump in the second phase in a power-saving mode and is configured to temporarily operate the charge pump in the first phase in the power-saving mode to recharge the first capacitive element.

According to certain aspects, the power supply circuit further includes a comparator (e.g., comparator 219) having a first input coupled to the first terminal of the first capacitive element and a second input coupled to the second terminal of the first capacitive element. For certain aspects, the charge pump is configured, during the power-saving mode, to operate in the second phase until a difference between voltages at the first and second inputs of the comparator falls below a threshold voltage (e.g., Cboot UVLO) and to temporarily enter the first phase in response to the voltages at the first and second inputs of the comparator falling below the threshold voltage.

According to certain aspects, the charge pump is configured, during the power-saving mode, to periodically temporarily operate in the first phase according to a constant interval.

According to certain aspects, the power supply circuit further includes a voltage regulator (e.g., the voltage regulator 217) having a first input coupled to a third input voltage node (e.g., the MID node) of the SMPS circuit and having an output coupled to the first input node of the charge pump. For certain aspects, the voltage regulator has a second input coupled to an output voltage node (e.g., the VPH node) of the SMPS circuit. In this case, the voltage regulator may be configured to select between the first input and the second input for supplying current to drive the SMPS circuit.

According to certain aspects, the SMPS circuit includes a first transistor (e.g., transistor Q1), a second transistor (e.g., transistor Q2) coupled to the first transistor via a first node (e.g., the CFH node), a third transistor (e.g., transistor Q3) coupled to the second transistor via a second node (e.g., the VSW node), a fourth transistor (e.g., transistor Q4) coupled to the third transistor via a third node (e.g., the CFL node), a second capacitive element (e.g., Cfly) having a first terminal coupled to the first node and a second terminal coupled to the third node, and an inductive element (e.g., inductor L1) having a first terminal coupled to the second node. For certain aspects, the SMPS circuit further includes a fifth switch (e.g., switch S5) having a first terminal coupled to the first terminal of the inductive element and has a second terminal coupled to a second terminal of the inductive element. For certain aspects, the SMPS circuit is configured as a three-level buck converter when the fifth switch is open and is configured as a divide-by-two charge pump when the fifth switch is closed. For certain aspects, a drain of the second transistor is coupled to a source of the first transistor, a drain of the third transistor is coupled to a source of the second transistor, and/or a drain of the fourth transistor is coupled to a source of the third transistor. In this case, a drain of the first transistor may be coupled to a third input voltage node (e.g., the MID node) of the SMPS circuit, the first node of the SMPS circuit may be coupled to the second input voltage node, a source of the fourth transistor may be coupled to a reference potential node of the SMPS circuit. For certain aspects, the SMPS circuit further includes a first driver (e.g., driver 202) having an output coupled to a gate of the first transistor, a second driver (e.g., driver 204) having an output coupled to a gate of the second transistor, a third driver (e.g., driver 206) having an output coupled to a gate of the third transistor, and a fourth driver (e.g., driver 208) having an output coupled to a gate of the fourth transistor. In this case, the first driver may have a first power terminal coupled to the first input voltage node of the SMPS circuit and the third switch of the charge pump. The first driver may also have a second power terminal coupled to the second input voltage node of the SMPS circuit, to the first node of the SMPS circuit, and to the fourth switch of the charge pump. In this case, the power supply circuit may further include a third capacitive element (e.g., capacitor Cdrv1) coupled between the first and second power terminals of the first driver. For certain aspects, the power supply circuit further includes a first clamping supply (e.g., clamping supply 210) having an input coupled to the first input voltage node of the SMPS circuit and to the third switch of the charge pump, having a first output (e.g., VH2) coupled to a first power terminal of the second driver, and having a second output coupled to a second power terminal of the second driver and to the second node of the SMPS circuit. In this case, the power supply circuit may further include a second clamping supply (e.g., clamping supply 212) having an input coupled to the first input voltage node of the SMPS circuit and to the third switch of the charge pump, having a first output (e.g., VH3) coupled to a first power terminal of the third driver, and having a second output coupled to a second power terminal of the third driver and to the third node of the SMPS circuit. For certain aspects, the fourth driver has a first power terminal coupled to the first input node of the charge pump and to the first switch of the charge pump. In this case, the fourth driver may have a second power terminal coupled to a reference potential node of the SMPS circuit and to a source of the fourth transistor.

CONCLUSION

During a power-saving mode (e.g., a pulse-skipping mode) for certain aspects of the present disclosure in which a capacitor of a charge pump is disconnected from at least one power supply rail (e.g., first and second input nodes of the charge pump) and is coupled to power terminals (of one or more drivers) of an SMPS circuit (e.g., first and second input voltage nodes thereof), the capacitor is temporarily disconnected from the power terminals and temporarily coupled to the at least one power supply rail (e.g., for a few microseconds).

The various operations of methods described above may be performed by any suitable means capable of performing the corresponding functions. The means may include various hardware and/or software component(s) and/or module (s), including, but not limited to a circuit, an application-specific integrated circuit (ASIC), or a processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:
 a switched-mode power supply (SMPS) circuit having a first input voltage node and a second input voltage node; and
 a charge pump comprising:
  a first capacitive element having a first terminal and a second terminal;
  a first switch coupled between a first input node of the charge pump and the first terminal of the first capacitive element;
  a second switch coupled between the second terminal of the first capacitive element and a second input node of the charge pump;
  a third switch coupled between the first terminal of the first capacitive element and the first input voltage node of the SMPS circuit; and
  a fourth switch coupled between the second terminal of the first capacitive element and the second input voltage node of the SMPS circuit, wherein:
   in a first phase, the first and second switches are configured to be closed, and the third and fourth switches are configured to be open;
   in a second phase, the third and fourth switches are configured to be closed, and the first and second switches are configured to be open; and
   the power supply circuit is configured to operate the charge pump in the second phase in a power-saving mode and configured to temporarily operate the charge pump in the first phase in the power-saving mode to recharge the first capacitive element.

2. The power supply circuit of claim 1, further comprising a comparator having a first input coupled to the first terminal of the first capacitive element and a second input coupled to the second terminal of the first capacitive element.

3. The power supply circuit of claim 2, wherein the charge pump is configured, during the power-saving mode, to operate in the second phase until a difference between voltages at the first and second inputs of the comparator falls below a threshold voltage and is configured to temporarily enter the first phase in response to the voltages at the first and second inputs of the comparator falling below the threshold voltage.

4. The power supply circuit of claim 1, wherein the charge pump is configured, during the power-saving mode, to periodically temporarily operate in the first phase according to a constant interval.

5. The power supply circuit of claim 1, further comprising a voltage regulator having a first input coupled to a third input voltage node of the SMPS circuit and having an output coupled to the first input node of the charge pump.

6. The power supply circuit of claim 5, wherein:
the voltage regulator has a second input coupled to an output voltage node of the SMPS circuit; and
the voltage regulator is configured to select between the first input and the second input for supplying current to drive the SMPS circuit.

7. The power supply circuit of claim 1, wherein the SMPS circuit comprises:
a first transistor;
a second transistor coupled to the first transistor via a first node;
a third transistor coupled to the second transistor via a second node;
a fourth transistor coupled to the third transistor via a third node;
a second capacitive element having a first terminal coupled to the first node and a second terminal coupled to the third node; and
an inductive element having a first terminal coupled to the second node and a second terminal coupled to an output voltage node of the SMPS circuit.

8. The power supply circuit of claim 7, wherein the SMPS circuit further comprises a fifth switch having a first terminal coupled to the first terminal of the inductive element and having a second terminal coupled to the second terminal of the inductive element.

9. The power supply circuit of claim 7, wherein:
a drain of the second transistor is coupled to a source of the first transistor;
a drain of the third transistor is coupled to a source of the second transistor; and
a drain of the fourth transistor is coupled to a source of the third transistor.

10. The power supply circuit of claim 9, wherein:
a drain of the first transistor is coupled to a third input voltage node of the SMPS circuit;
the first node of the SMPS circuit is coupled to the second input voltage node; and
a source of the fourth transistor is coupled to a reference potential node of the SMPS circuit.

11. The power supply circuit of claim 7, wherein the SMPS circuit further comprises:
a first driver having an output coupled to a gate of the first transistor;
a second driver having an output coupled to a gate of the second transistor;
a third driver having an output coupled to a gate of the third transistor; and
a fourth driver having an output coupled to a gate of the fourth transistor.

12. The power supply circuit of claim 11, wherein:
the first driver has a first power terminal coupled to the first input voltage node of the SMPS circuit and the third switch of the charge pump; and
the first driver has a second power terminal coupled to the second input voltage node of the SMPS circuit, the first node of the SMPS circuit, and the fourth switch of the charge pump.

13. The power supply circuit of claim 12, further comprising a third capacitive element coupled between the first and second power terminals of the first driver.

14. The power supply circuit of claim 11, further comprising a first clamping supply having an input coupled to the first input voltage node of the SMPS circuit and to the third switch of the charge pump, a first output coupled to a first power terminal of the second driver, and a second output coupled to a second power terminal of the second driver and to the second node of the SMPS circuit.

15. The power supply circuit of claim 14, further comprising a second clamping supply having an input coupled to the first input voltage node of the SMPS circuit and to the third switch of the charge pump, having a first output coupled to a first power terminal of the third driver, and having a second output coupled to a second power terminal of the third driver and to the third node of the SMPS circuit.

16. The power supply circuit of claim 11, wherein:
the fourth driver has a first power terminal coupled to the first input node of the charge pump and to the first switch of the charge pump; and
the fourth driver has a second power terminal coupled to a reference potential node of the SMPS circuit and to a source of the fourth transistor.

17. The power supply circuit of claim 1, wherein the SMPS circuit comprises a three-level buck converter.

18. A power management integrated circuit (PMIC) comprising at least a portion of the power supply circuit of claim 1.

19. A battery charging circuit comprising the power supply circuit of claim 1.

20. A method of supplying power, comprising:
operating a power supply circuit comprising:
a switched-mode power supply (SMPS) circuit having a first input voltage node and a second input voltage node; and
a charge pump comprising:
a capacitive element having a first terminal and a second terminal;
a first switch coupled between a first input node of the charge pump and the first terminal of the capacitive element;
a second switch coupled between the second terminal of the capacitive element and a second input node of the charge pump;
a third switch coupled between the first terminal of the capacitive element and the first input voltage node of the SMPS circuit; and
a fourth switch coupled between the second terminal of the capacitive element and the second input voltage node of the SMPS circuit, wherein the operating comprises:
in a first phase, closing the first and second switches and opening the third and fourth switches; and
in a second phase, closing the third and fourth switches and opening the first and second switches;
entering a power-saving mode for the power supply circuit by operating the charge pump in the second phase; and
temporarily operating the charge pump in the first phase during the power-saving mode to recharge the capacitive element.

21. The method of claim 20, further comprising determining a difference between voltages at the first and second terminals of the capacitive element, wherein during the power-saving mode, the charge pump is operated in the second phase until the difference between the voltages falls below a threshold voltage and then the charge pump is temporarily operated in the first phase.

22. The method of claim 20, wherein the temporarily operating comprises periodically temporarily operating the charge pump in the first phase according to a constant interval during the power-saving mode.

23. The method of claim 20, wherein:
the power supply circuit further comprises a voltage regulator having a first input coupled to a third input voltage node of the SMPS circuit, having a second input coupled to an output voltage node of the SMPS circuit, and having an output coupled to the first input node of the charge pump; and
the method further comprises selecting between the first input and the second input for supplying current to drive the SMPS circuit.

24. The method of claim 20, wherein the power-saving mode comprises a pulse-skipping mode.

25. The method of claim 20, wherein the SMPS circuit further comprises a plurality of transistors and wherein during the power-saving mode, the method comprises deactivating the plurality of transistors.

26. A power supply circuit comprising:
a switched-mode power supply (SMPS) circuit having a first input voltage node, a second input voltage node, a third input voltage node, an output voltage node, and a reference potential node;
a charge pump comprising:
a first capacitive element having a first terminal and a second terminal;
a first switch coupled between an input node of the charge pump and the first terminal of the first capacitive element;
a second switch coupled between the second terminal of the first capacitive element and the reference potential node;
a third switch coupled between the first terminal of the first capacitive element and the second input voltage node of the SMPS circuit; and
a fourth switch coupled between the second terminal of the first capacitive element and the third input voltage node of the SMPS circuit; and
a comparator having a first input coupled to the first terminal of the first capacitive element and a second input coupled to the second terminal of the first capacitive element.

27. The power supply circuit of claim 26, wherein:
in a first phase, the first and second switches are configured to be closed, and the third and fourth switches are configured to be open;

in a second phase, the third and fourth switches are configured to be closed, and the first and second switches are configured to be open; and
the charge pump is configured, during a pulse-skipping mode, to operate in the second phase until a difference between voltages at the first and second inputs of the comparator falls below a threshold voltage and is configured to temporarily enter the first phase in response to the voltages at the first and second inputs of the comparator falling below the threshold voltage.

28. The power supply circuit of claim 26, further comprising a voltage regulator having a first input coupled to the first input voltage node of the SMPS circuit, having a second input coupled to the output voltage node of the SMPS circuit, and having an output coupled to the input node of the charge pump, wherein the voltage regulator is configured to select between the first input and the second input for supplying current to drive the SMPS circuit.

29. The power supply circuit of claim 26, wherein the SMPS circuit comprises:
a first transistor;
a second transistor coupled to the first transistor via a first node;
a third transistor coupled to the second transistor via a second node;
a fourth transistor coupled to the third transistor via a third node;
a second capacitive element having a first terminal coupled to the first node and a second terminal coupled to the third node; and
an inductive element having a first terminal coupled to the second node and a second terminal coupled to the output voltage node of the SMPS circuit.

30. The power supply circuit of claim 29, wherein the SMPS circuit further comprises:
a first driver having an output coupled to a gate of the first transistor;
a second driver having an output coupled to a gate of the second transistor;
a third driver having an output coupled to a gate of the third transistor;
a fourth driver having an output coupled to a gate of the fourth transistor; and
a third capacitive element, wherein:
the first driver has a first power terminal coupled to the first input voltage node of the SMPS circuit and the third switch of the charge pump;
the first driver has a second power terminal coupled to the second input voltage node of the SMPS circuit, the first node of the SMPS circuit, and the fourth switch of the charge pump; and
the third capacitive element is coupled between the first and second power terminals of the first driver.

* * * * *